Aug. 12, 1969    W. D. STUERTZ    3,460,173
BINDING MACHINE

Filed Sept. 19, 1967    6 Sheets-Sheet 1

Inventor.
William D. Stuertz
By J. Walton Bade
Attorney

Inventor
William D. Stuertz
By J. Walter Bade
Attorney

Inventor
William D. Stuertz
By J. Walton Bader
Attorney

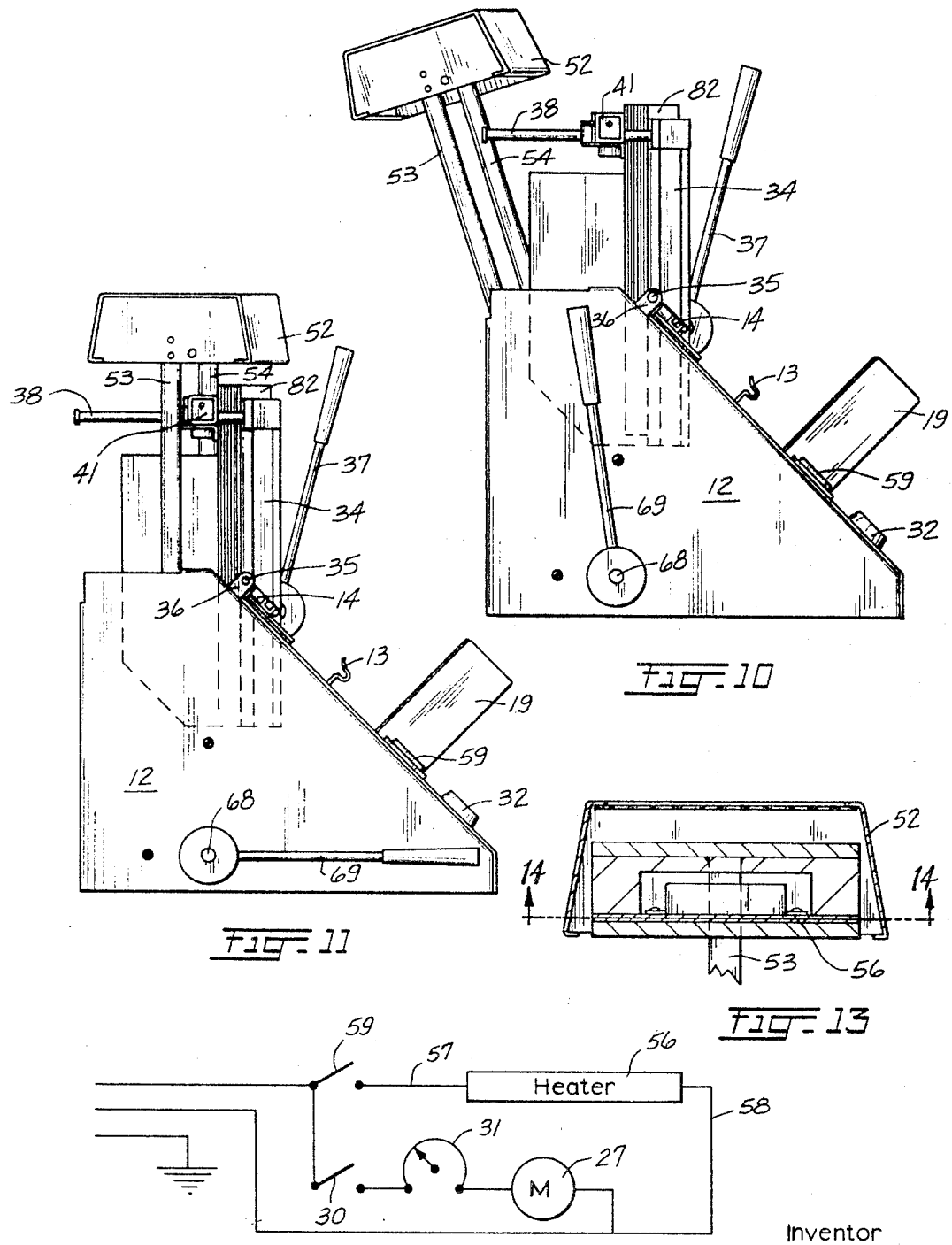

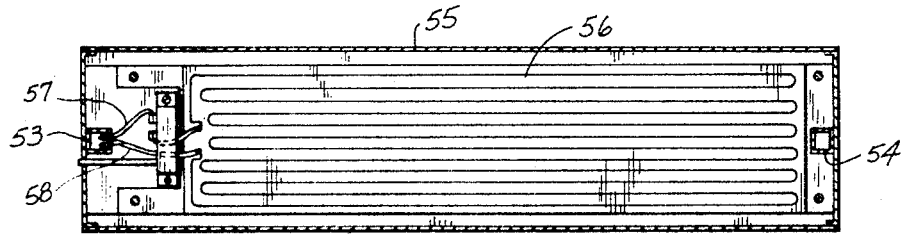
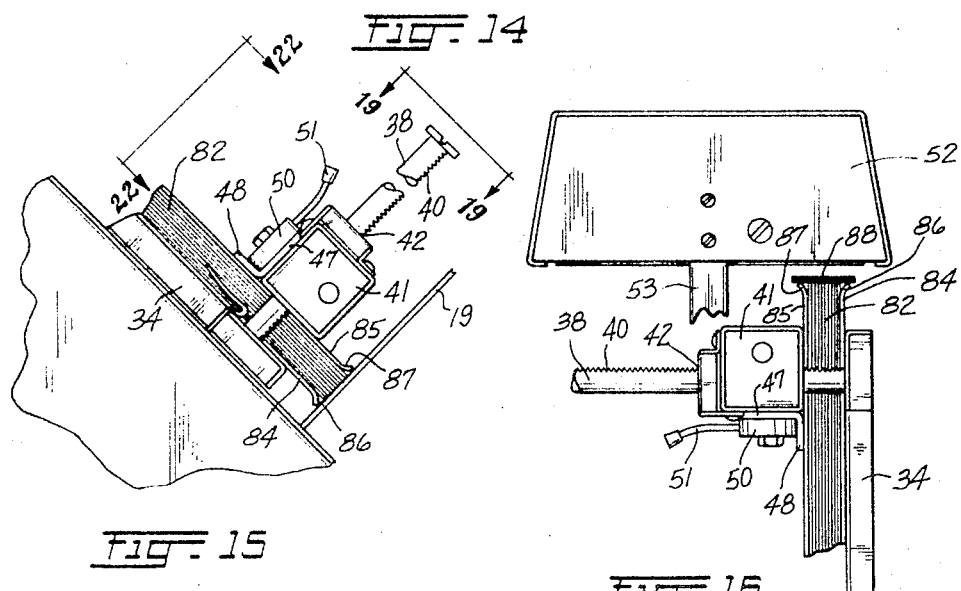
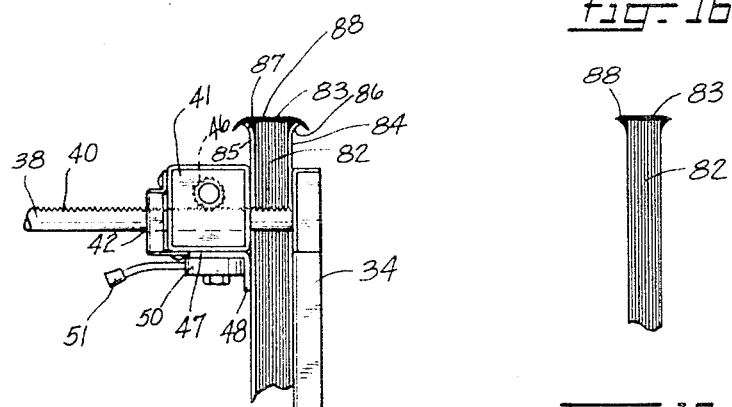

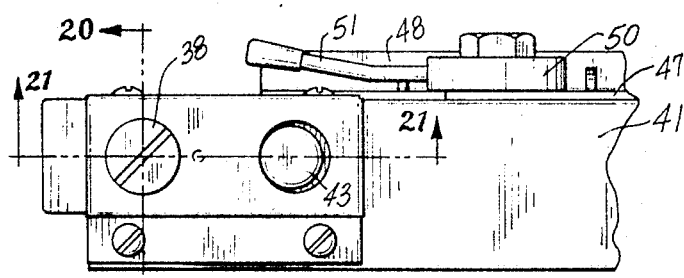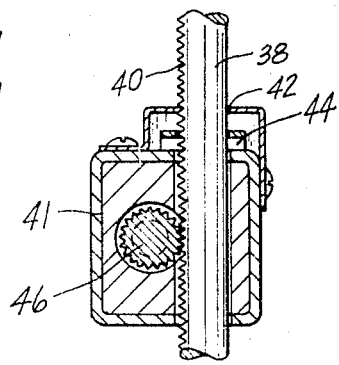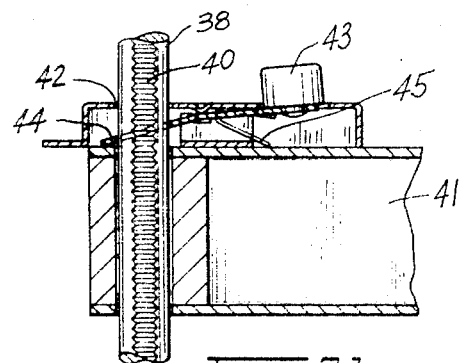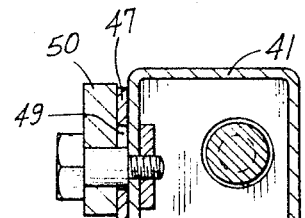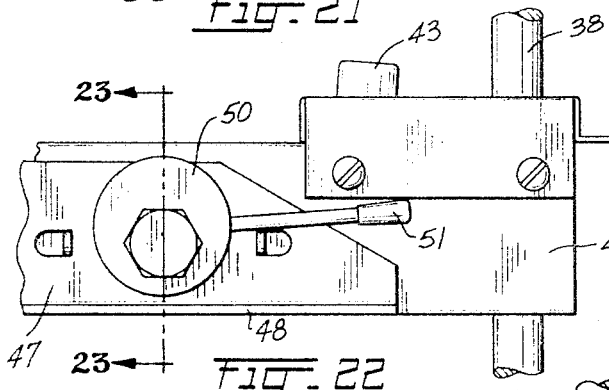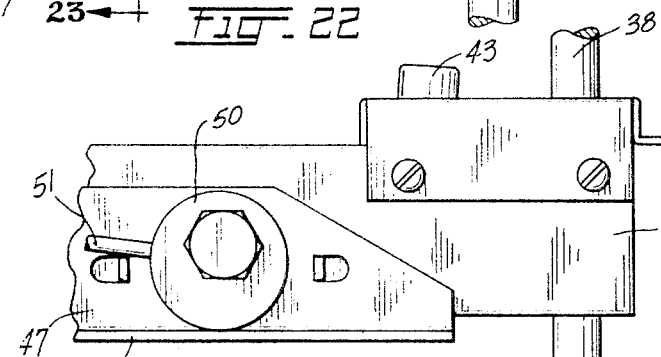

United States Patent Office 3,460,173
Patented Aug. 12, 1969

3,460,173
BINDING MACHINE
William D. Stuertz, Glenview, Ill., assignor to Wilson Jones Company, Niles, Ill., a corporation of Delaware
Continuation-in-part of application Ser. No. 507,480, Nov. 12, 1965. This application Sept. 19, 1967, Ser. No. 668,881
Int. Cl. B42c 19/00
U.S. Cl. 11—1
1 Claim

ABSTRACT OF THE DISCLOSURE

A binding device is shown which includes a supporting frame. A first sheet support is resiliently mounted and includes a plate member projecting from the frame. A motor is connected to the first sheet support to permit this support to be jogged.

A pivotally movable second sheet support is also connected to the frame in spaced relationship with the first sheet support; a movable compressor member is carried by the second support. An elongated housing carries a heater therewithin and is movable into and out of operative position with the second sheet support.

DESCRIPTION OF THE INVENTION

This invention relates to a binding machine which is utilized to attach a binding strip to the edge portions of a plurality of sheets which have been previously placed in vertically aligned relationship. This application is a continuation-in-part of my co-pending application Ser. No. 507,480 filed Nov. 12, 1965, now abandoned.

In binding machines, in general, it is necessary to have some means to secure the binding strip to the edge portions of the sheets. This can be done, of course, by conventional liquid glues. However such glues take a period of time to dry which slows down the binding process. In addition the glues have a tendency to "creep" out of the desired position between the sheets and the binding strip and will thus dirty the other parts of the machine or of the sheets to be bound.

For this reason it is generally considered desirable to utilize hot-melt glues. Therefore heater means of some kind must be employed with the binding machine. In addition means must be employed to place the sheets into aligned relationship and to maintain the sheets in such position prior to the binding step.

It is also desirable, in machines of this type, to obtain a smooth appearance of the glue material about the sheets after the glue hardens. This can be done in various ways but one of the means which can be employed is shown in this application. It includes the placing of a pair of binding plates on opposite faces of the sheets to be bound with each of the binding plates having an offset portion. The offset portions of the plates are disposed in opposite directions, the sheets are then bound, and the bound sheets are cut along the binding plates. This produces a relatively smooth appearance of the bound sheets.

The binding machine of this invention contains a number of additional novel features.

A first sheet supporting member is provided which can be jogged so that the sheets to be bound can be easily and quickly aligned. A second sheet supporting member is spaced from the first sheet supporting member and is pivotally movable. The second sheet supporting member includes clamping means to permit the edge portions of the sheets to be bound to be held firmly in position and to project from this member. A heater is disposed within a housing which is pivotally movable into operative relationship with the edge portions of the sheets to be bound. Timing means are operatively connected with the heater means which permit the heater means to be operated for the requisite length of time to permit binding to take place.

The above constitutes a brief description of this invention and some of the objects and advantages thereof. Other objects and advantages of this invention will become apparent as the description proceeds.

The invention will now be further described by reference to the accompanying drawings which are made a part of this specification.

FIG. 10 is a side elevational view of the device of this invention with the handle means utilized to move the elongating housing into operative position shown in the "up" position with the elongated housing in inoperative relationship.

FIG. 11 is a view similar to that of FIG. 10 but showing the position of the handle means when the housing is brought into operative relationship with the second sheet supporting member.

FIG. 12 is a diagrammatic view of the electrical controls of the heater means and jogging means of this invention.

FIG. 13 is a detail sectional view taken along lines 13—13 of FIG. 1.

FIG. 14 is a detail sectional view taken along lines 14—14 of FIG. 13. This figure shows the details of the heater means disposed within the housing.

FIG. 15 is a detail side elevational view showing the upstanding supports, the ratchet means, the lock means carried by the compressor member, the elongated downwardly movable holding member carried by the compressor member, and one of the rotatable eccentric members. This structure is utilized to firmly hold the sheets to the second sheet supporting member.

FIG. 16 is a detail elevational view showing the position of the parts as heat is applied to the side portions of the sheets to be bound by the heater means.

FIG. 17 is a view similar to that of FIG. 16 but with the heater means removed and the sheets in bound position.

FIG. 18 is a detail side elevational view of a plurality of sheets in bound relationship after the binding plates have been removed.

FIG. 19 is a detail plan view of one of the rotatable eccentric members and associated structure.

FIG. 20 is a cross-sectional view taken along lines 20—20 of FIG. 19.

FIG. 21 is a cross-sectional view taken along lines 21—21 of FIG. 19.

FIG. 22 is a detail side elevational view of the structure shown in FIG. 19.

FIG. 23 is a cross-sectional view taken along lines 23—23 of FIG. 22.

FIG. 24 is a detail side elevational view of one of the rotatable eccentric members and associated structure with the eccentric member holding the holding member in extreme down position.

Figure 1:
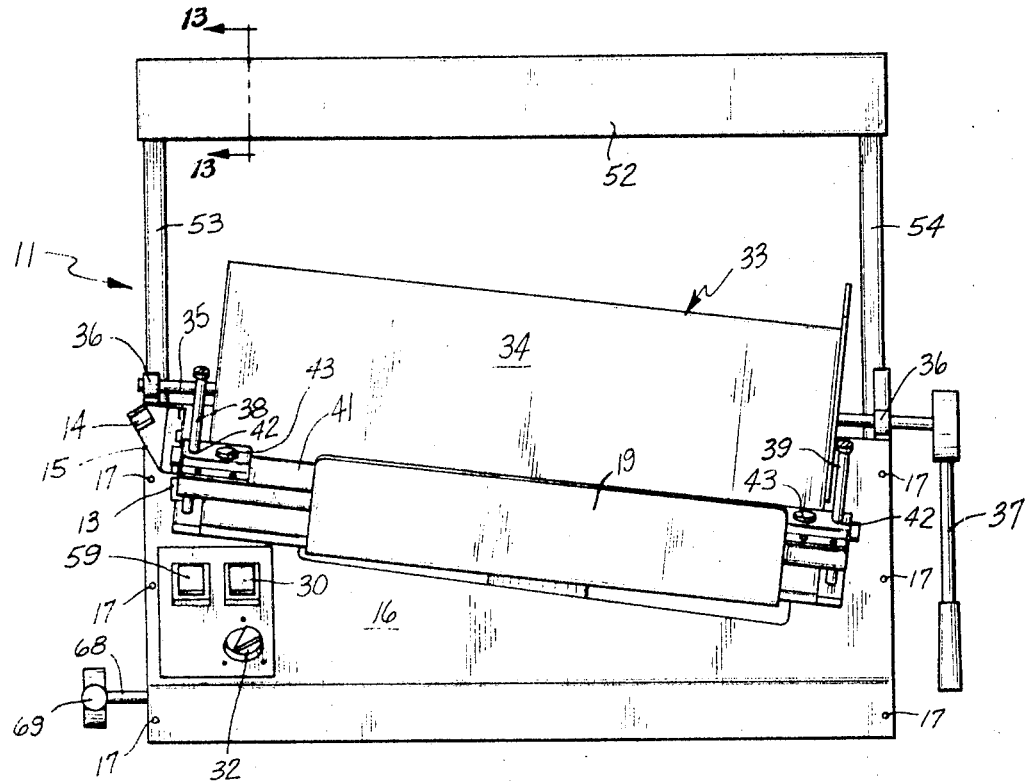
FIG. 1 is a front elevational view of a binding machine made in accordance with this invention.

The invention will now be further described by reference to the specific forms thereof shown in the accompanying drawings. In this connection, however, the reader is cautioned to note that the specific forms of this invention as shown in the specification herein are for illustrative purposes and for purposes of example only. Various changes and modifications could obviously be made within the spirit and scope of this invention.

Now referring to the specific form of this invention as shown in the drawings for a detailed description thereof there is shown a binding machine 11 which includes a supporting frame 12. Carried by supporting frame 12 is spring support 13 and pivotally movable U-shaped clamp 14. Clamp 14 is disposed upon support 15 which is hingedly connected to faceplate 16. Faceplate 16 is connected to supporting frame 12 by screws 17.

A first sheet supporting member 18 is secured to supporting frame 12. Member 18 includes a forwardly projecting plate 19 and a base 20. Plate 19 is secured to base 20 by a plurality of offset portions 21 which bear slots 22 which are traversed by screws 23 having wide head portions.

Base 20 is resiliently supported on mounts 24 which are made of rubber or other resilient material. Base 20 also carries a pair of support portions 25 which bear grommets 26 thereupon which in turn are spaced from the base of the supporting frame of the machine. Thus base 20 is in resilient floating relationship and can be jogged.

A motor 27 is placed in operative relationship with base 20 and is supported by portions 28 and screws 29. It is obvious that as motor 27 vibrates it will cause a jogging action to be produced upon base 20.

Motor 27 is controlled by switch 30 which is shown here as a push-button type. The speed of motor 27 is controlled by rheostat 31, the positions being indicated by knob 32.

A second sheet support 33 is also provided. Support 33 includes a base 34 and a shaft 35 which is connected to the underside of base 34 and is supported within members 36 which are in turn connected to supporting frame 12. At one end portion of shaft 35 is a handle 37 which permits shaft 35 to be rotated and thus to move base 34 into the proper positions necessary for operation of this invention.

Shaft 35 is inclined downwardly from left to right and base 34 is also inclined from left to right. Member 18 is also inclined downwardly from left to right to the same degree as base 34. As a result the sheets 82 are easily jogged into position since they fall into alignment by gravity. However the inclination of shaft 35 is less than that of base 34. As a result, when the device is placed in the position shown in FIG. 11 the edges of the sheets 82 are the same distance from heater 56 contained within housing 52.

Connected to base 34 of support 33 are a pair of spaced upstanding members 38 and 39. Each of members 38 and 39 bear ratchet portions 40 thereupon. A compressor member 41 is provided which carries a plurality of openings 42 which are adapted to accommodate members 38 or 39 respectively.

A button 43 is disposed adjacent the respective member 38 or 39 and abuts a catch 44. A spring 45 is provided to hold catch 44 in locked position. A gear 46 is provided which is movable along the respective support.

Secured to the side of compressor 41 is holding plate 47. Plate 47 is formed with an offset portion 48 which is parallel to base 34 of support 33. Plate 47 is movable upwardly and downwardly by means of elongated hole 49. Behind hole 49 is eccentric 50 which is movable by means of handle 51. The structure described is located on opposite sides of plate 47 and is adjacent to each opening 42 in compressor member 31.

An elongated housing 52 is provided which is supported by means of a plurality of downwardly depending supports 53 and 54. Housing 52 includes a shield member 55 and a heater member 56. Heater 56 is the conventional resistance heater which is operated by means of electrical connectors 57 and 58. A switch 59 is provided to control the operation of heater 56.

Supports 53 and 54 are each connected to plates 60 by means of an offset portion 61 which lies alongside the respective member 53 or 54. Offset portion 61 is secured to member 53, for example, by screws (not shown).

The lower end portion of member 53 is disposed within a pocket 62 which in turn bears an extension 63 which is pivotally movable along pin 64 which is in turn secured to the side 65 of the supporting frame.

Within member 60 is a snake-like recess 66 and a pin 67 is disposed within recess 66 and is in turn connected to the side 65.

A shaft 68 is provided which is connected to handle 69. Shaft 68 is in turn connected to link 70 which in turn is connected to link 71 by pin 72. Link 71 is in turn movable about pivot pin 73 which in turn is connected to plate 60. Spring 74 has one end connected to pin 73 and the opposite end connected to a link (not shown) which is spaced from member 73 and is located upon the interior face of member 65 toward the front portion thereof.

Shaft 68 also bears an arm 75 which is downwardly movable under the urging of shaft 68. Arm 75 bears a cam portion 76 which is adapted to abut cam 77 at link portion 78. Cam 77 is in turn connected to shaft 79 which in turn is connected to timer 80 and controls the period of timing thereof. A bell 81 is likewise provided which is rung when cam 77 moves to its upward position.

With the foregoing specific description the operation of this invention may now be explained.

The plurality of sheets 82 which are to be bound are placed in position preferably in a lengthwise manner along plate 19 of support 18. Motor 27 is turned on by depression of switch 30 and the speed of jogging controlled by rheostat 31.

Figure 2:
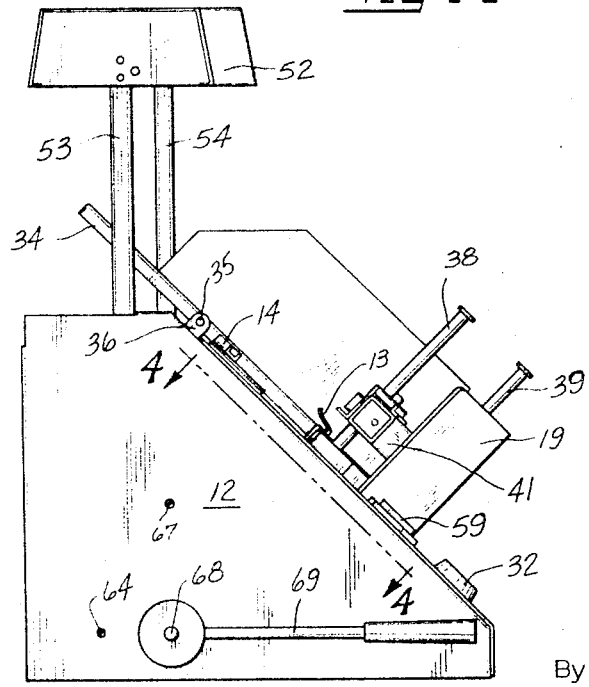
FIG. 2 is a side elevational view of the binding machine shown in FIG. 1 with the second sheet supporting member in its lowermost position.
Figure 3:
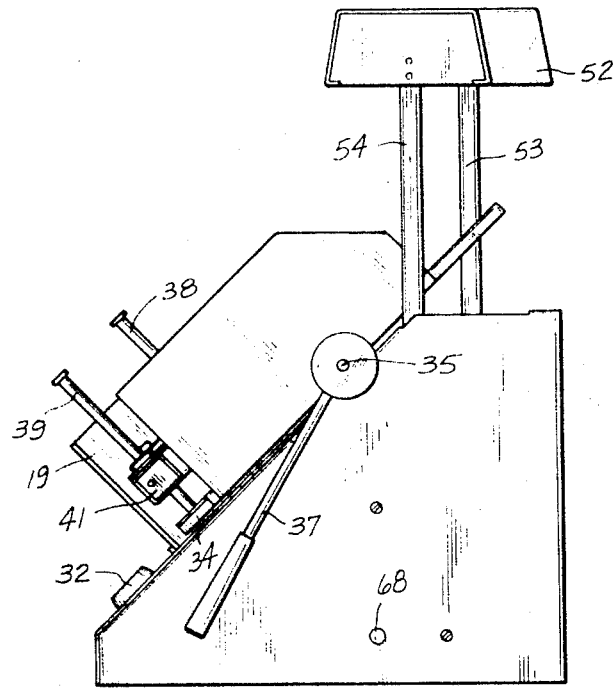
FIG. 3 is an opposite side elevational view to the side elevational view shown in FIG. 2.
Figure 4:
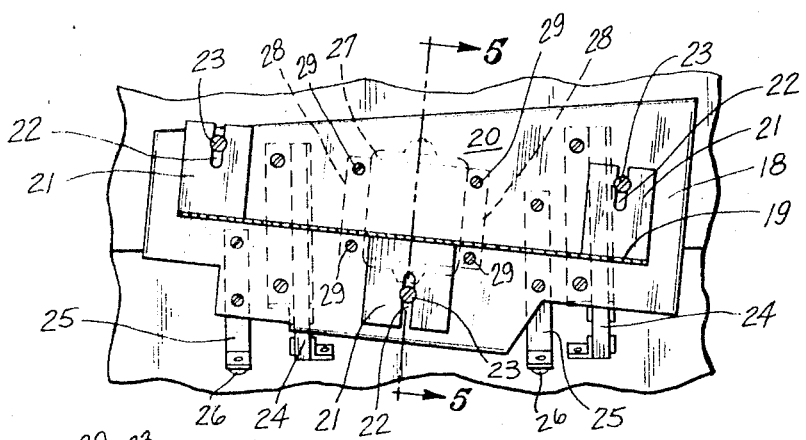
FIG. 4 is a cross-sectional view taken along lines 4—4 of FIG. 2.
Figure 5:
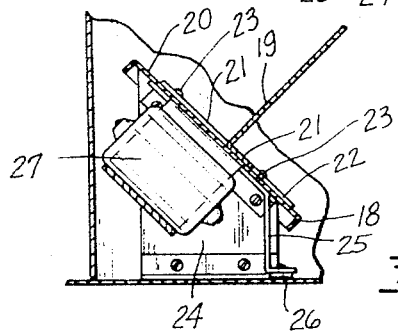
FIG. 5 is a cross-sectional view taken along lines 5—5 of FIG. 4.

When the sheets are thus treated so that they will be properly oriented so that they will be in a configuration of jogged relationship and properly aligned they are then removed from the position along plate 19 and transferred to the position shown in FIG. 2 (the sheets are removed from the showing in FIG. 2 for clarity of illustration). The edges 83 of sheets 82 which are to be bound are caused to project slightly forwardly from base 34 of support 33 as shown in FIG. 6.

Compressor member 41 is moved downwardly along members 38 and 39 until the sheets 82 are tightly compressed between members 41 and 34. At this point handles 51 are actuated moving eccentrics 50 rotatably which in turn forces holding plate 47 even more tightly down against sheets 82 thereby causing these sheets to be retained in tightly compressed position. In the preferred modification of this invention as shown in FIG. 15 prior to the sheets being compressed binding plates 84 and 85 are placed on opposite sides of sheets 82. Binding plates 84 and 85 are provided with offset portions 86 and 87 which extend in opposite directions as shown in FIG. 15.

Figure 6:
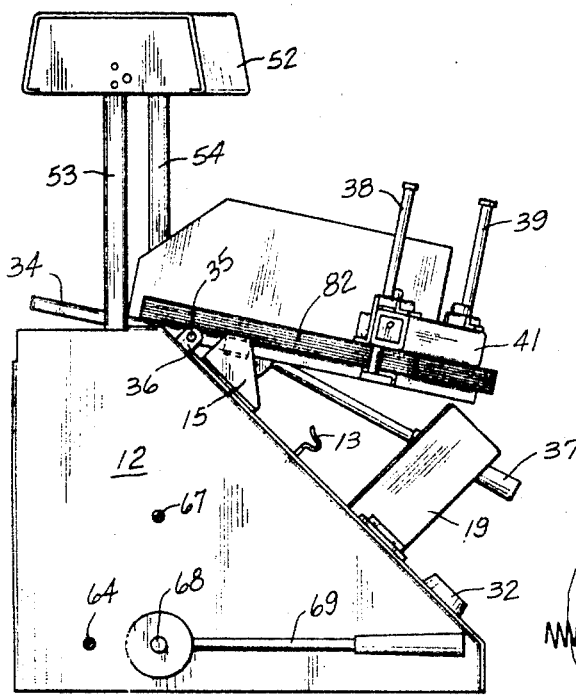
FIG. 6 is a side elevational viewing showing a plurality of sheets to be bound with the second sheet supporting member in the position utilized to permit adhesive to be placed upon the edge portions thereof to be bound.
Figure 7:
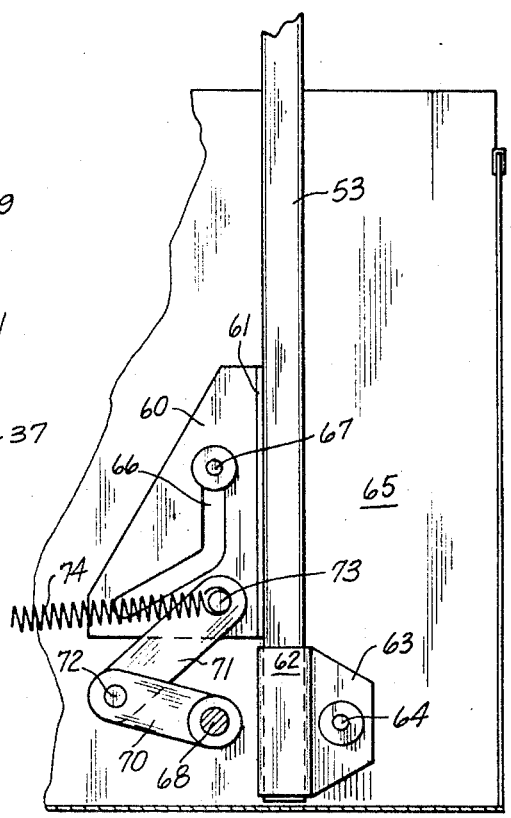
FIG. 7 is a detail elevational view, partly in section, showing details of the mechanism utilized to permit the elongated housing to be brought into operative position with the second sheet supporting member.
Figure 8:
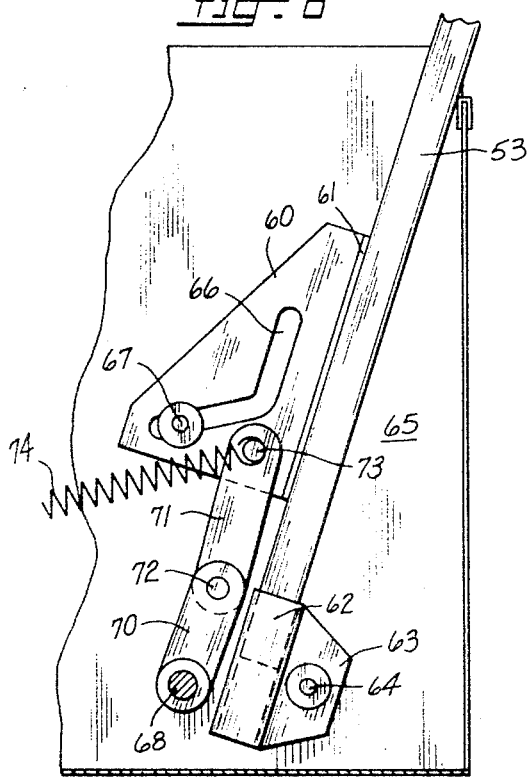
FIG. 8 is a view similar to that of FIG. 7 but showing the motion of the parts as the housing is brought out of operative relationship.
Figure 9:
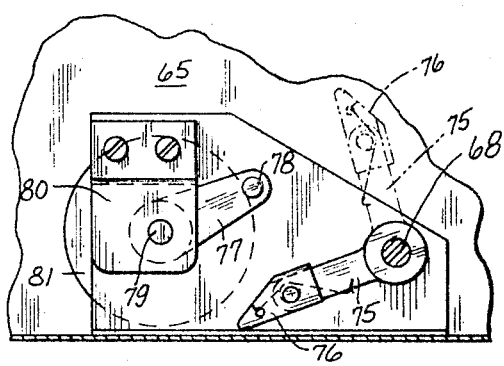
FIG. 9 is a detail view of the means utilized to control the operation of the timer as the housing is brought into operative relationship. The released position of the timer arm is shown in phantom lines.

Handle 37 is then pivotally moved and member 15 moved in position to underlie member 34 as shown clearly in FIG. 6. A hot-melt adhesive 88 is then placed alongside edges 33 of sheets 82. Handle 37 is then used to place member 33 in the position shown in FIG. 10. Handle 69 is then moved which causes member 55 to assume the position shown in FIG. 11. The movement of member 55 and associated parts causes portion 76 of member 75 to strike element 78 and thereby cause member 77 to move downwardly actuating timer 80 and closing switch 59. This causes the heater 56 to become hot and melt the hot-melt adhesive. Heater 56 will remain on until timer 80 has completed its cycle when member 77 will move upwardly and will strike bell 81 giving an audible signal. At this point handle 69 is used to place member 55 and associated parts in the position shown in FIG. 10. The hot-melt adhesive 88 now assumes the position shown in FIG. 17. A knife may then be caused to move along the offset portions 86 and 87 of members 84 and 85 and members 84 and 85 and the associated sheets removed by depressing buttons 43 and thereby moving compressor member 41 out of compressive relationship with sheets 82. Members 84 and 85 may now be removed and the sheets 82 bound along edge 83 with the hot-melt adhesive having the configuration shown in FIG. 18.

The foregoing sets forth the manner in which the objects of this invention are achieved.

I claim:
1. A binding device comprising, in combination:
 (a) a supporting frame,
 (b) a first sheet supporting member including a base and a plate carried by said base and projecting forwardly from said frame,
 (c) a pair of resilient members supporting said base,
 (d) electrically operated motor means upon said base permitting said base to be selectively jogged,
 (e) a pivotally movable second sheet supporting member spaced from said first sheet supporting member and also carried by said frame, said member including a base plate and a pair of upstanding supports, each of said supports having ratchet means thereupon,
 (f) an elongated compressor member provided with a pair of openings each accommodating one of said upstanding supports,
 (g) lock means carried by said compressor member adapted to selectively abut said ratchet means so that said compressor member may be positioned at spaced points along said supports,
 (h) an elongated downwardly movable holding member carried by a side of said compressor member, said holding member having an offset elongated portion parallel with the base plate of said second sheet supporting member,
 (i) a pair of rotatable eccentric members abutting said offset elongated portion of said holding member,
 (j) a pivotally movable U-shaped clamp member carried by said supporting frame and adapted to selectively support said second sheet supporting member in substantially horizontal position,
 (k) an elongated housing having a pair of spaced downwardly depending supports pivotally secured to said supporting frame,
 (l) electrically operated heater means disposed within said elongated housing,
 (m) link means and spring means operatively connected with said downwardly depending supports of said housing permitting said housing to be moved forwardly and downwardly into operative relationship with said second sheet supporting member,
 (n) timing means controlling said heater means, said timing means including a projecting cam actuated by forward and downward movement of said housing.

References Cited
UNITED STATES PATENTS

| 2,526,987 | 10/1950 | Wilson. |
| 2,760,214 | 8/1956 | Hesselmann. |
| 3,146,473 | 9/1964 | Hoff. |
| 3,261,044 | 7/1966 | Hoff. |
| 3,321,786 | 5/1967 | Bolick. |

LAWRENCE CHARLES, Primary Examiner